United States Patent [19]
Jia et al.

[11] Patent Number: 5,726,896
[45] Date of Patent: Mar. 10, 1998

[54] METHOD AND SYSTEM FOR SPLINE INTERPOLATION, AND THEIR USE IN CNC

[75] Inventors: Ji Jia; Elaine Cohen; Samuel H. Drake; Russell D. Fish, all of Salt Lake City, Utah

[73] Assignee: University of Utah Research Foundation, Salt Lake City, Utah

[21] Appl. No.: 705,194

[22] Filed: Aug. 29, 1996

Related U.S. Application Data

[60] Provisional application No. 60/003,396, Aug. 30, 1995.

[51] Int. Cl.$^6$ .............................. G06F 19/00; G06G 7/66
[52] U.S. Cl. ..................... 364/474.29; 364/474.24; 395/578; 395/133; 395/105; 395/87; 318/568.1 B
[58] Field of Search .................. 364/474.29, 474.24, 364/578; 395/133, 105, 87; 318/568.13; 100/43; 408/8, 141, 142, 143, 144; 266/10; 52/86, 586.1, 586.2; 148/210

[56] References Cited

U.S. PATENT DOCUMENTS

| | | | |
|---|---|---|---|
| 3,609,319 | 9/1971 | Clifird, Jr. .............................. | 395/105 |
| 3,727,191 | 4/1973 | McGee .............................. | 340/172.5 |
| 4,031,369 | 6/1977 | Heaman et al. .............................. | 395/87 |
| 4,086,522 | 4/1978 | Engelberger et al. .............. | 318/568.13 |
| 4,453,221 | 6/1984 | Davis et al. .............................. | 395/87 |
| 4,794,540 | 12/1988 | Gutman et al. ..................... | 364/474.29 |
| 5,014,230 | 5/1991 | Sinha et al. .............................. | 364/578 |
| 5,028,855 | 7/1991 | Distler et al. ....................... | 318/568.13 |
| 5,119,309 | 6/1992 | Cavendish et al. ................. | 364/474.24 |
| 5,140,236 | 8/1992 | Kawamura et al. ................. | 318/568 B |
| 5,227,978 | 7/1993 | Kato .............................. | 364/474.3 B |
| 5,321,623 | 6/1994 | Ensenat et al. ..................... | 364/474.3 B |
| 5,412,300 | 5/1995 | Meyer et al. ....................... | 318/568.11 |
| 5,500,927 | 3/1996 | Sander-Cederlof et al. ........... | 395/133 |
| 5,510,995 | 4/1996 | Olivier .............................. | 364/474.24 |

OTHER PUBLICATIONS

Lorentz, G.G., Bernstein Polynomials, University of Toronto Press, 1953.

de Boor, C., A Practical Guide to Splines, Springer–Verlag, New York 1978.

Lane, J., and R. Risenfeld, "A Theoretical Development for the Computer Generation and Display of Piecewise Polynomial Surfaces", IEEE Transactions, vol. PAMI 2, No. 1, Jan. 1980.

Cohen, E., T. Lyche and R. Risenfeld, "Discrete B–Splines and Subdivision Techniques in Computer–Aided Geometric Design and Computer Graphics", Computer Graphics and Image Processing, vol. 14, 1980.

Jia, J., "Spline Interplation Algorithms for CNC Machining", Master's thesis, University of Utah, Sep. 1994.

Reetz, V., "Universal Spline Concepts," Energy and Automation, vol. 11, Special EMO, 1989, pp. 19–20.

Primary Examiner—Reba I. Elmore
Assistant Examiner—Marc McDieunel
Attorney, Agent, or Firm—Lee Hollaar; Eleanor V. Goodall; Daniel P. McCarthy

[57] ABSTRACT

An iterative spline interpolation method for a numerically-controlled machine tool device is disclosed. The non-uniform rational B-spline (NURBS) curve inputted to the numerically-controlled machine tool is interpolated with a constant step size providing the ability to maintain a controlled velocity to within a specified tolerance. In addition, the distance left to travel on the curve is obtained by a unique spline node-based approximation method providing accurate acceleration and deceleration control. The rational spline interpolation method provides significant reduction in the amount of data required to produce smoothly machined pieces while providing accurate machining of conic sections not possible by previous spline interpolation methods.

18 Claims, 12 Drawing Sheets

METHOD AND SYSTEM FOR SPLINE INTERPOLATION, AND THEIR USE IN CNC

This application claims the benefit of U.S. Provisional Application No. 60/003396, filed Aug. 30, 1995.

BACKGROUND OF THE INVENTION

1. Field of the Invention

The present invention relates to numerical control of a machine tool device and in particular to a spline interpolation method for determining tool motion within a specified tolerance of the given spline curve with controlled velocity.

2. Description of the Related Art

Numerically controlled machine tools have typically used linear and circular arc segments along which to drive the tool. These segments are typically inputted to the controller by command data known as G-codes. Each G-code is composed of the alphabetic character G, a numerical value following the character G, and additional codes following the numerical value. More recently, part geometry has become more complex requiring the use of more advanced curve geometries. Parametric spline curves are becoming more popular in design systems and, until recently, these curves were approximated by a large number of linear segments before sending them to the controller. Unfortunately, to achieve the desired tolerance, a large number of very small line segments are produced. The large number of linear segments can be prohibitive given the memory capabilities of the numerically controlled machine. In addition, the shortness of the linear segments can cause jerky motion at high speeds, possibly even causing the machine to halt. To solve this problem, several spline interpolation methods have been developed. These method reduce the amount of data required by the controller and allow the controller to more adequately control the motion.

Prior art relating to spline interpolation varies in the type of curves that can be inputted and the ability of the controller to adequately control the motion. Most spline functions that can be interpolated by the prior art are spline functions with a power basis. Such functions can be described by a set of coefficients, $K_1, K_2, K_3, K_4$, along with the power basis in the following form:

$$q(t) = K_4 t^3 + K_3 t^2 + K_2 t + K_1.$$

Typically, a set of points to be interpolated by the spline curve is inputted by custom G-codes[or other means], and various conditions regarding smoothness and derivatives at end points are assumed or inputted using custom G-codes as well. The resulting piecewise spline curves are then evaluated at successive parametric values producing a plurality of positions through which the machine tool is linearly driven.

Specifically, interpolation of a plurality of points in sequence by a sequence of piecewise cubic spline curves using a power basis with Hermite end conditions is known from U.S. Pat. No. 5,140,236 to Kawamura et al. Interpolation of cubic spline curves using a power basis with polynomial or rational Taylor series predictors is known from U.S. Pat. No. 5,321,623 to Ensenat et al. An iterative method of spline interpolation using a power basis with inputted derivatives is known from U.S. Pat. No. 4,794,540 to Gutman et al. A method for approximating an ideal path curve with piecewise spline curves using a power basis is known from U.S. Pat. No. 5,028,855 to Distler et al. All the above-cited patents are hereby incorporated by reference.

However, there are three problems which are either not addressed or not adequately solved in the prior art 1. Parametric curves in general, and spline curves in particular, are not parameterized by arclength and, except for rare special cases, such a parameterization can only be approximated. Without explicit control of the variation in the parameterization to within a given tolerance, the machine tool's velocity may fluctuate around the desired feed rate, possibly causing aberrations in the finish or unnecessary wear of the machine tool.

2. Not all curve geometry is easily represented by splines using a power basis. Not only is the geometry of the power basis spline hard to visualize, but computer aided design (CAD) systems often do not use a power basis for representing spline curves. Instead, shape approximating splines must be converted to power basis splines before they are sent to the controller. In addition, splines from a power basis can only approximate conic sections such as circular and ellipsoidal arcs.

3. The machine tool is very massive and must accelerate and decelerate to prevent gouging at the beginning and end of motion blocks in which the direction changes. Computing an accurate measure of how much further the machine tool must move along a spline curve is essential to enable the controller to decelerate at the appropriate time. The distance left to travel is non-trivial for parametric curves in general, and spline curves in particular, and the prior art does not address this issue.

Maintaining constant velocity during interpolation of spline curves is addressed by two prior art teachings. The first, U.S. Pat. No. 4,794,540 to Gutman et al., describes a method that requires that M-1 derivatives of the spline curves be inputted. The alternative to inputting these derivatives is to compute them by solving a system of linear equations. Although inputting all of the derivatives for these points is feasible for splines from a power basis, it is not desirable. In addition, it is not practical for some splines which use other basis functions, and the computations required to invert the matrices which are used to compute these derivatives are prohibitive for real-time control. Indication is given in Gutman that the suggested derivative approximations made to enforce constant velocity produce overshoot, which is unacceptable for CNC machining. In addition, splines which use other basis functions, such as non-uniform rational B-splines, are usually not derived in closed form because of their complexity, so the method of Gutman would not be useful for these types of curves.

In the second prior art teaching, U.S. Pat. No. 5,321,623 to Ensenat et al., constant velocity is maintained by basing the parametric step size on a first or second order Taylor series approximation for the spline curve at each step. However, since the next parametric value is determined by an approximation to the derivative whereupon the position on the spline curve is evaluated, the actual step size may vary, causing slight fluctuations in the velocity of the machine tool. The Ensenat admits that "Small errors in the approximation may result in small speed errors, it is true, but not in position errors." Ensenat does not provide a method for bounding either the velocity errors or the deviation in actual step size, so the method may cause finish aberrations.

The second problem discussed above states that the power basis is not sufficient to represent all curve geometry. In particular, CAD systems often create curves from circles and arcs which do not have exact representations in splines with a power basis. To represent circular sections, the spline curves must be rational. A particular form of rational spline curve which is becoming a standard type of curve used in computer-aided design systems is the non-uniform rational B-spline (NURBS) curve, described in detail later. U.S. Pat.

No. 5,227,978 to Kato discloses a method for inputting NURBS by G-codes to a numerical control device, but it lacks the velocity control required for practical use in a numerically controlled machine tool device. In addition, the method used to compute the machine tool positions is recursive and, as such, is computationally expensive. If higher order curves are inputted, the CNC machine may take too long between successive outputs of position, causing the machine tool to stop and start.

The third problem relates to practical embodiment of the invention. In order to prevent overshoot which results in gouging, the controller uses a measure of the distance left to travel before the end of the motion block. By modifying the desired step size, the velocity of the machine tool can not only be made constant, but can be controlled. Utilization of this type of acceleration and deceleration control is known for lines and arcs, the standard motion blocks that all controllers use, from U.S. Pat. No. 3,727,191 to McGee. Determining the distance left to travel for parametric curves is more difficult but just as necessary for preventing overshoot. The prior art which relates to spline interpolation makes no mention of this practical requirement.

SUMMARY OF THE INVENTION

In view of the problems listed above, it is the objective of the present invention to provide a method and system for interpolating general spline curves, and in particular rational Bézier and NURBS curves of arbitrary order, on a numerically controlled machine tool device, using a controlled step size based on the desired feed rate, and providing an approximate measure of the distance left to travel.

The method of this invention is to input via G-code[mean]s, the requisite order, number of control points, knot vector, and control points which describe the NURBS curve. Alternately, the requisite set of control points for a Bézier curve is inputted via G-code[mean]s. In each case, a custom G-code is added to the controller to enable each new type of input. The method of this invention uses an adaptive forward differencing technique to accurately produce the requested step size which, in turn, enables velocity control to a given tolerance. The parametric step size is adaptively modified from the previous parametric step size to produce an arclength step size to within a given tolerance of the desired arclength step size along the curve.

In addition, the method of this invention also produces a estimated measure of the distance left to travel which enables the controller to accelerate and decelerate appropriately. The estimated measure of the distance left to travel is a smooth blend of an upper bound and lower bound of the actual arclength distance left to travel.

These features of the present invention enable a numerically controlled machine tool device to produce a clean finish in a variety of materials without gouging or causing unnecessary wear on the machine tool either by breaking chips improperly or by making inappropriate power demands.

These and other features of the invention will be more readily understood upon consideration of the attached drawings and of the following detailed description of those drawings and the presently preferred embodiments of the invention.

DETAILED DESCRIPTION OF THE PREFERRED EMBODIMENT

Figure 1:
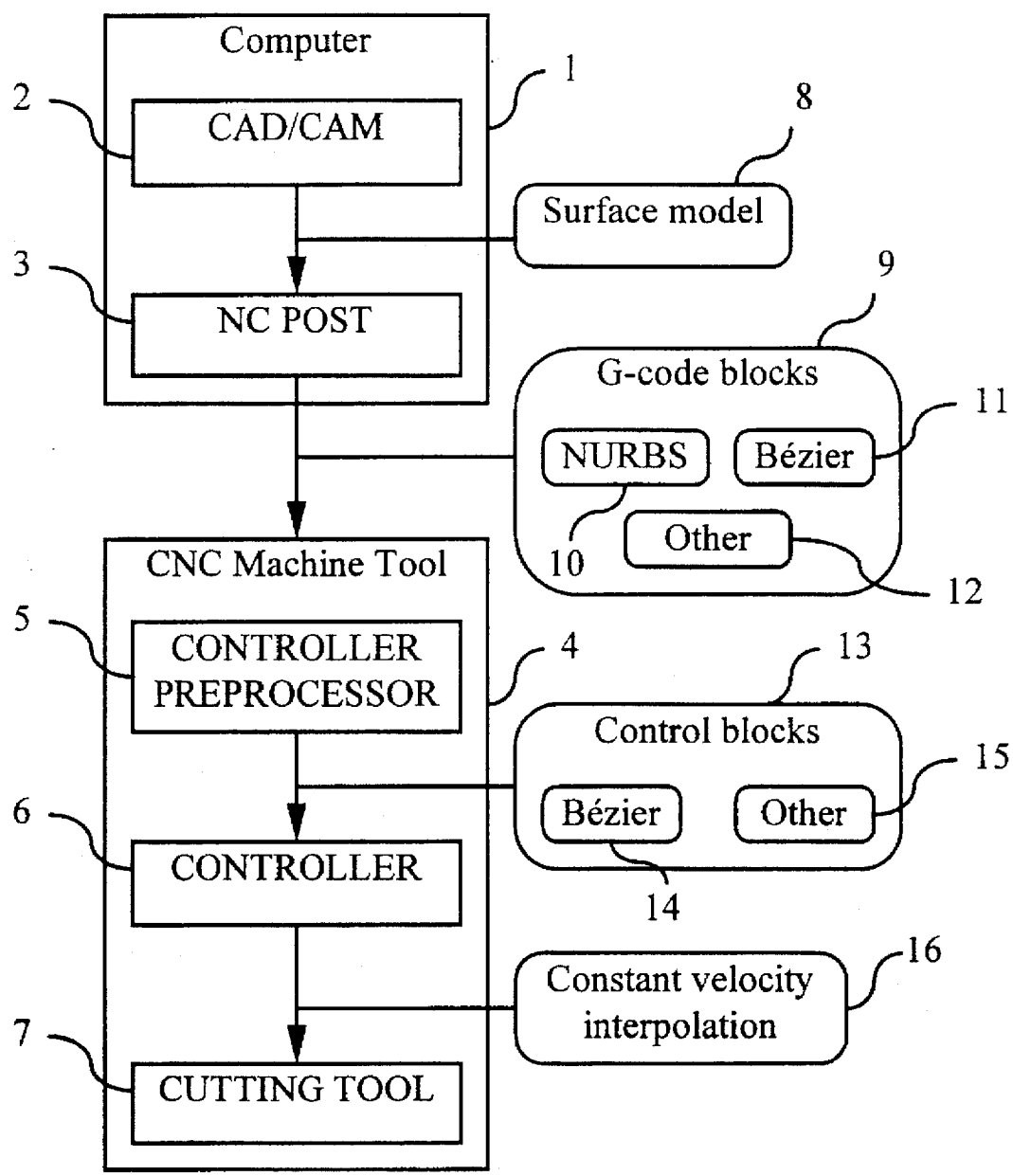
FIG. 1 is a diagram of the flow of information from the design system to the numerically controlled machine tool.

A diagram of the presently preferred embodiment of the invention is shown in FIG. 1. Computer I contains two modules, a CAD/CAM apparatus 2 and an NC post processor 3. CAD/CAM apparatus 2 provides a framework within which the description of the part in the form of a surface model 8 is designed. Surface model 8 is passed to NC post processor 3 which decomposes surface model 8 into motion blocks 9 comprising NURBS 10 and Bézier 11 motion blocks as well as the standard line and arc motion blocks and other G-code blocks 12. NURBS 10 and Bézier 11 motion blocks and other G-code blocks 12 are then transferred to CNC machine tool 4. Within CNC machine tool 4, the first module, controller preprocessor 5, receives NURBS 10 and Bézier 11 motion blocks and other G-code blocks 12 and transforms NURBS motion blocks 10, according to methods of the present invention described later, into Bézier motion blocks 14. In addition, other preprocessing steps not related to this invention are performed. Modified control blocks 13 containing Bézier motion blocks 14, but no NURBS motion blocks 10 are passed to the controller 6. Controller 6 interprets modified control blocks 13, performing controlled velocity interpolation 16 of Bézier motion blocks 14 by the method of the present invention described later, thereby controlling the motion and operation of cutting tool 7.

An alternate embodiment of this invention would not convert NURBS motion blocks 10 into Bézier motion blocks 14 in controller preprocessor 5, but would allow them to pass directly to controller 6 along with Bézier motion blocks 14 and other modified G-codes 15. Controller 6 then combines the steps of conversion to Bézier and controlled velocity Bézier interpolation 16 to control the motion and operation of cutting tool 7. When controller 6 becomes faster and can compute the required operations in the amount of time available between each step, this will likely become the preferred embodiment.

The problems of acceleration and deceleration and controlled velocity discussed above are problems for any numerically controlled machine in which the motion of an end effector interpolates a spline. In robotics, for example, overshoot can cause collisions which could be damaging to the robot's environment or to the robot itself. In addition, velocity fluctuations can cause unnecessary wear on the servos which control the motion of the end effector.

The presently preferred embodiment transforms descriptions of NURBS curves into descriptions of Bézier curves and then interpolates the Bézier curves with controlled velocity and other unique properties of this invention. To detail how the transformation takes place, a discussion of B-splines curves follows.

Figure 2:
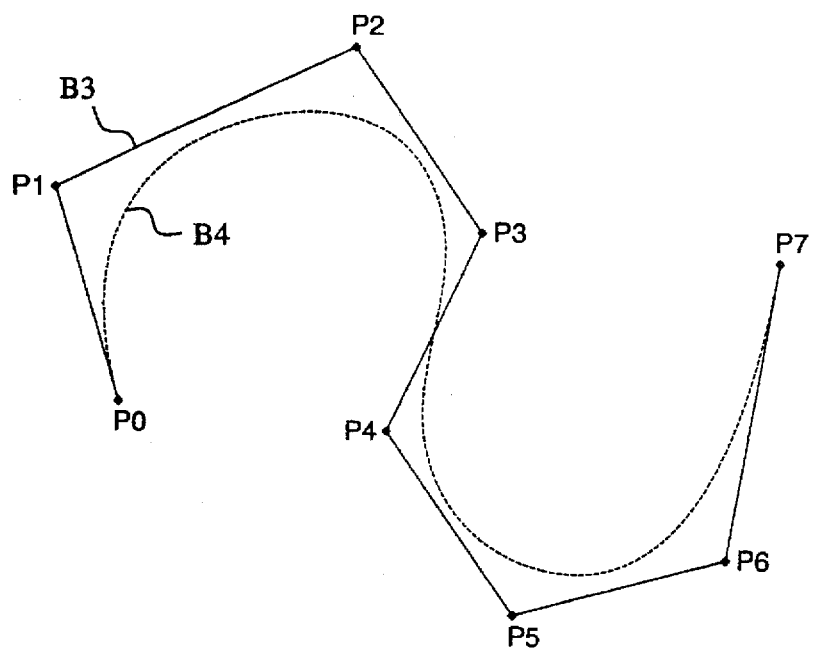
FIG. 2 shows a cubic B-spline with open end conditions.

A B-spline curve B4 shown FIG. 2 is a shape approximating curve comprising an order B1, a knot vector B2 and a set of vector or scalar coefficients which comprise a control polygon B3. Order B1 of the B-spline curve B4 and knot vector B2 determine a set of basis functions N1–N8 (shown FIG. 3) in a fashion similar to the power basis used by the prior art, which are then linearly combined with the coefficients of the control polygon to describe the shape of B-spline curve B4. In particular, the following equations define B-spline curve B4, $\gamma(t)$, for the open or periodic control polygon B3, $P=\{P_i\}_0^n$.

$$\gamma(t) = \sum_{i=0}^{n} P_i B_{i,k,\tau}(t) \quad (1)$$

where $$\tau = \{\tau_i\}_0^{q-n+k} \quad (2)$$

is the knot vector B2 over which $B_{i,k,\tau}(t)$ are defined, and $B_{i,k,\tau}(t)$ are the normalized local support B-spline basis functions (N1–N8 from FIG. 3) of order k(degree k–1). If $\tau_0 \leq \tau_1 \leq \ldots \leq \tau_q$ is a sequence of real numbers, for k=1, ..., q, and i=0, ..., q–k, then $$B_{i,k,\tau}(t) = \begin{cases} 1 & \text{of } \tau_i \leq t \leq \tau_{i+1} \\ 0 & \text{otherwise} \end{cases}$$

and for $k > 1$, $$B_{i,k,\tau}(t) = \begin{cases} \dfrac{t-\tau_i}{\tau_{i+k-1}-\tau_i} B_{i,k-1,\tau}(t) + \dfrac{\tau_{i+k}-t}{\tau_{i+k}-\tau_{i+1}} B_{i+1,k-1,\tau}(t) & \text{if } \tau_i < \tau_{i+k} \\ 0 & \text{otherwise} \end{cases}$$

If either of the denominators in Equation (3) equals zero, that term is defined to equal zero.

Figure 4:
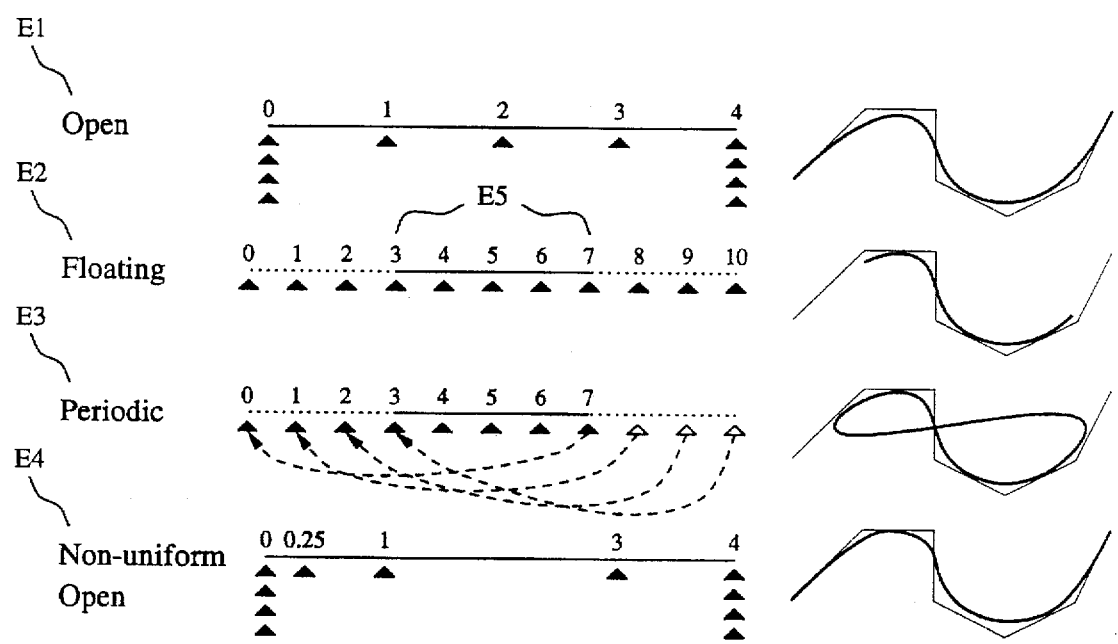
FIG. 4 shows the knot vectors for the various types of end conditions for B-spline curves.

FIG. 4 shows three common types of end conditions for the B-spline curve; open E1, floating E2, and periodic E3. The Bézier curve has open end conditions by definition. A B-spline curve has open E1 end conditions when its knot vector has k multiples of both the smallest and the largest knots.

A B-spline has floating E2 end conditions when the k smallest and largest knots are simple knots, i.e. they are not duplicated. A B-spline curve is uniform when the knots are uniformly spaced, and non-uniform E4, conversely. A B-spline curve with periodic E3 end conditions has the same number of coefficients (control points) in its control polygon as knots, and has a knot vector similar to a B-spline with floating end conditions. In the case of floating end conditions, basis functions N1–N8 (from FIG. 3) are non-zero outside of the parametric range of the curve. In the case of periodic E3 end conditions, the knot vector is "wrapped around" so that the curve near the beginning of the parametric range becomes a linear combination of control points at the beginning and end of the control polygon, and similarly for the end of the curve.

Floating E2 and periodic E3 end conditions are easily converted to open E1 end conditions. "Unwrapping" the knot vector and control polygon of a periodic B-spline gives an exactly equivalent floating B-spline. Adding knots to increase the multiplicity of both end knots E5 to k-fold (k is the order of the curve) converts a floating E2 B-spline into an exactly equivalent open B-spline. This may be done by using the Oslo Algorithm desribed in "Discrete B-Splines and Subdivision Techniques in Computer-Aided Geometric Design and Computer Graphics" by E. Cohen, T. Lyche and R. Riesenfeld, published in Computer Graphics and Image Processing, Vol. 14, 1980, which is hereby incorporated by reference. In the preferred embodiment of this invention, the end conditions are inferred from the number of control points in control polygon B3, the number of knots in knot vector B2, and the configuration of the knots in knot vector B2.

Additional properties of B-spline curves are known, for example, from "A Practical Guide to Splines" by C. de Boor, published by Springer-Verlag, New York, 1978, which is hereby incorporated by reference.

Further, rational B-splines have become widely used, especially to represent conic sections such as circular and ellipsiodal arcs. The non-uniform rational B-spline (NURBS) curve is described as follows. If $\tau=\tau_0, \ldots, \tau_{n+k}$, $\tau_i \leq \tau_{i+1}$ and $\tau_i \leq \tau_{i+k}$, for all appropriate i, and $B_{0,k,\tau}(t), \ldots, B_{n,k,\tau}(t)$ are the N+1 B-spline basis functions defined over the knot vector, $\tau$, then for a sequence of vector or scalar coefficients $P_0, \ldots, P_n$, comprising a control polygon and a sequence of scalars, $w_0, \ldots, w_n$, the NURBS curve of order k is $$\gamma(t) = \dfrac{\sum_{i=0}^{n} w_i P_i B_{i,k}(t)}{\sum_{i=0}^{n} w_i B_{i,k}(t)}. \quad (4)$$

The $\{w_i\}$ are called the homogeneous coordinates for $\{P_i\}$, because of their resemblance in function to the homogeneous coordinates in a perspective transformation. The determining parameters of the rational B-spline curve are the knot vector and the homogeneous point $h_i=(h_{x,i},h_{y,i},h_{z,i},h_{w,i})$, where if $P_i=(x_i,y_i,z_i), h_{x,i}=w_i x_i, h_{y,i}=w_i y_i, h_{z,i}=w_i z_i$. When all the scalar values in $w_0, \ldots, w_n$ equal 1, Equation (4) is same as Equation (1). The B-spline basis functions satisfy $$\sum_{i=0}^{n} B_{i,k}(t) \equiv 1.$$

A Bézier curve is a polynomial curve that is a linear combination of Bernstein basis functions. The $i^{th}$ Bernstein polynomial of degree n over the arbitrary interval [a,b] is $$\theta_{i,n}(a,b;t) = \binom{n}{i} \dfrac{(1-t)^{n-i} t^i}{(b-a)^n}, (i=0,1,\ldots,n).$$

The set of all Bernstein polynomials of degree n form a basis for the set of all polynomials of degree n. Bernstein polynomials are known, for example, from "Bernstein Polynomials" by G. G. Lorentz, published by University of Toronto Press, 1953, which is hereby incorporated by reference. When the interval is [0,1], the Bernstein polynomials are:

$$\theta_{i,n}(t) = \binom{n}{i}(1-t)^{n-i}t^i, (i=0, 1, \ldots, n). \quad (5)$$

The representation of a Bézier polynomial of degree n is $$\gamma[P_0, \ldots, P_n: a, b](t) = \sum_{i=0}^{n} b_i \theta_{i,n}(a, b: t) \quad (6)$$

where $b_i$, (i=0, . . . , n) are the Bézier control points and $\theta_{i,n}(a, b:t)$ are the $i^{th}$ Bernstein polynomials of degree n. The Bézier polygon is formed by joining the Bézier control points (Bézier vertices) $b_i$, (i=0, . . . , n), in order. When the parameter t is in interval [0,1], the Bézier curve is denoted:

$$\gamma(t) = \sum_{i=0}^{n} b_i \theta_{i,n}(t). \quad (7)$$

Since $\gamma(0)=b_0$, and $\gamma(1)=b_n$ from Equation (5) the Bézier curve passes through first and last Bézier vertices. Also, the tangents at the endpoints are in the same direction as the first and last line segments of the control polygon.

The Bézier curve is a special case of the B-spline curve. When knot values for the B-spline in Equation (3) are specially chosen, the B-spline basis functions reduce to the Bernstein/Bézier blending functions. Therefore, a B-spline curve can be exactly represented by a series of piecewise Bézier curves.

Shape approximation with rational splines is generally not well understood except within the context of conic sections, such as arcs and ellipses. Indeed, rational B-splines are necessary for the exact representation of conic sections; ordinary B-splines or splines with a power basis are insufficient.

The presently preferred embodiment incorporates a conversion from the general NURBS representation to the Bézier representation of the same order. The transformation method utilizes a known method called subdivision described as follows.

Given $\gamma[b_0, \ldots, b_n:a,d](t)$ as in Equation (6) then $$\gamma[b; a, d](t) = \begin{cases} \gamma[b_0^{[0]}, b_1^{[1]}, \ldots, b_n^{[n]}; a, c](t) \\ \gamma[b_n^{[n]}, b_n^{[n-1]}, \ldots, b_n^{[0]}; a, c](t) \end{cases}$$

where k is the order and $$b_i^{[k]} = \begin{cases} \dfrac{[(d-c)b_{i-1}^{[k-1]} + (c-a)b_i^{[k-1]}]}{(b-a)} & k>0, k \leq i \leq n. \\ b_i & k=0 \end{cases}$$

For a formal proof of this method of conversion, refer to "A Theoretical Development for the Computer Generation and Display of Piecewise Polynomial Surfaces" by J. Lane and R. Riesenfeld, published in IEEE Transactions, Vol. PAMI 2, No. 1, January 1980, which is hereby incorporated by reference.

Although Bézier curves and surfaces are special cases of NURBS curves, they lack some of the essential features of NURBS curves. Bézier basis functions are global in that moving any control point will affect the entire curve. In addition, as the number of control points increases, so does the order of the curve. This can make the curve very unmanageable. Therefore, utilizing NURBS curves for part design will generally be the preferred method.

Figure 3:
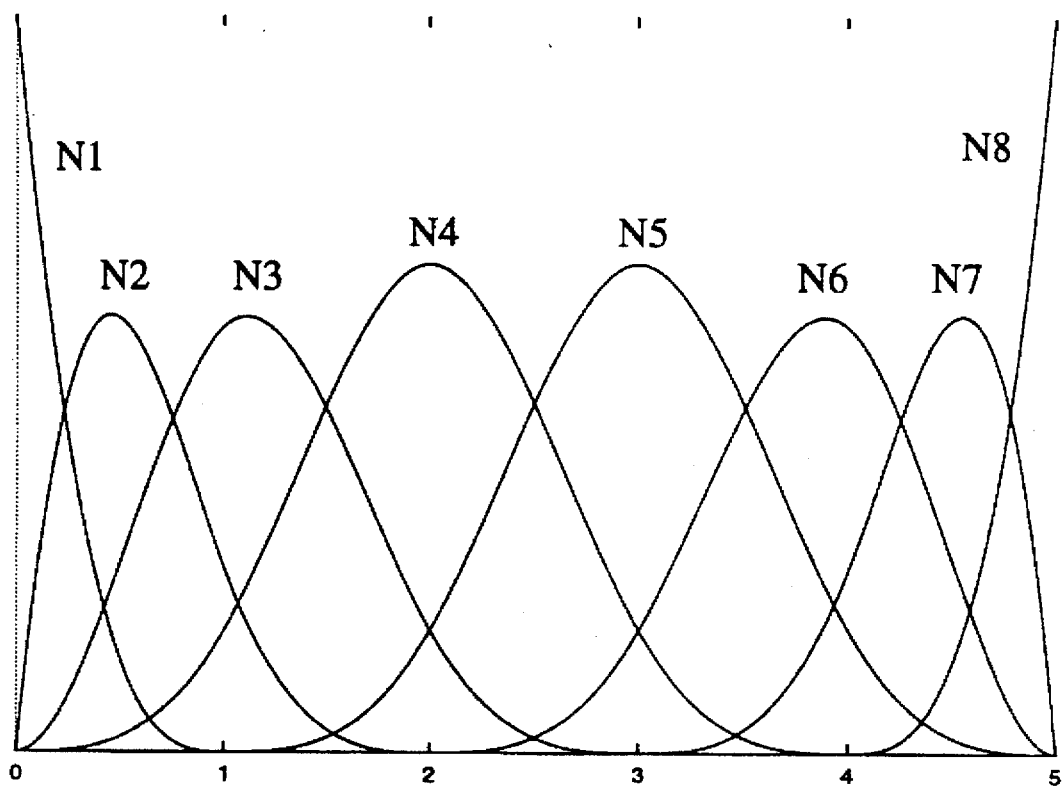
FIG. 3 shows the blending functions of the cubic B-spline curve.
Figure 5:
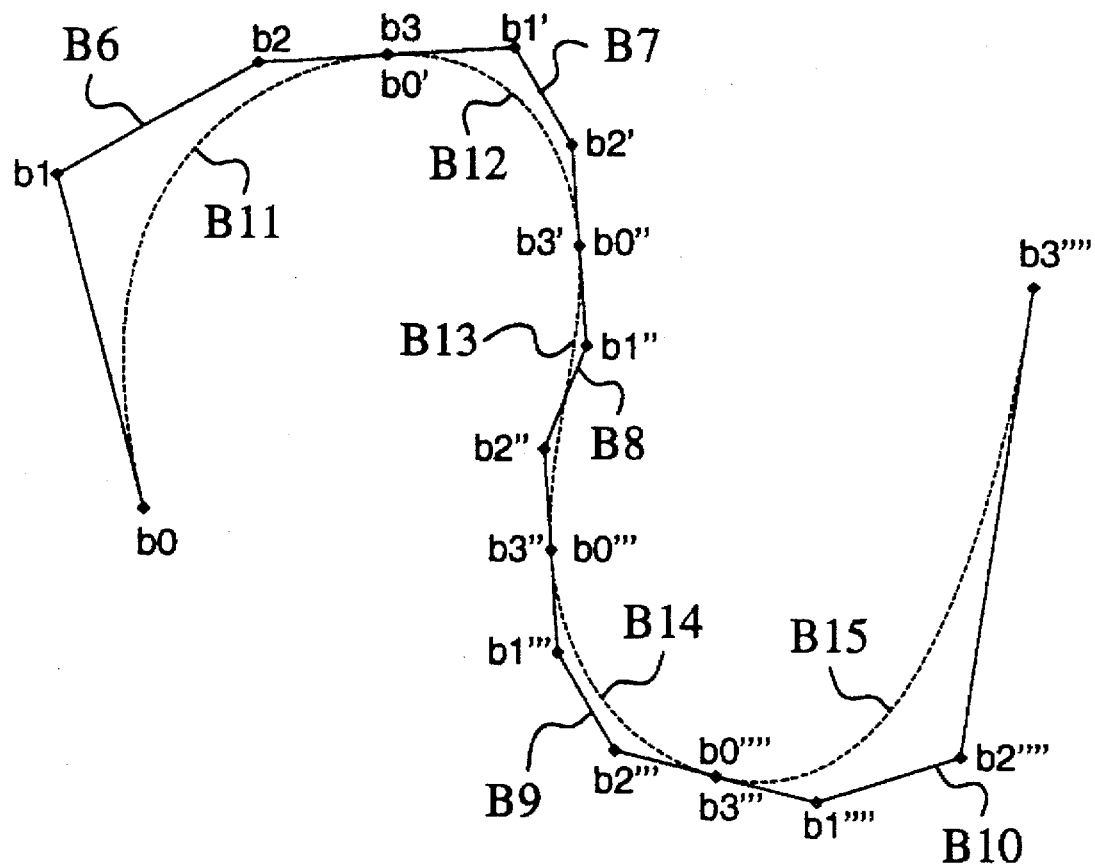
FIG. 5 shows the piecewise cubic Bézier curves which represent the B-spline curve.
Figure 6:
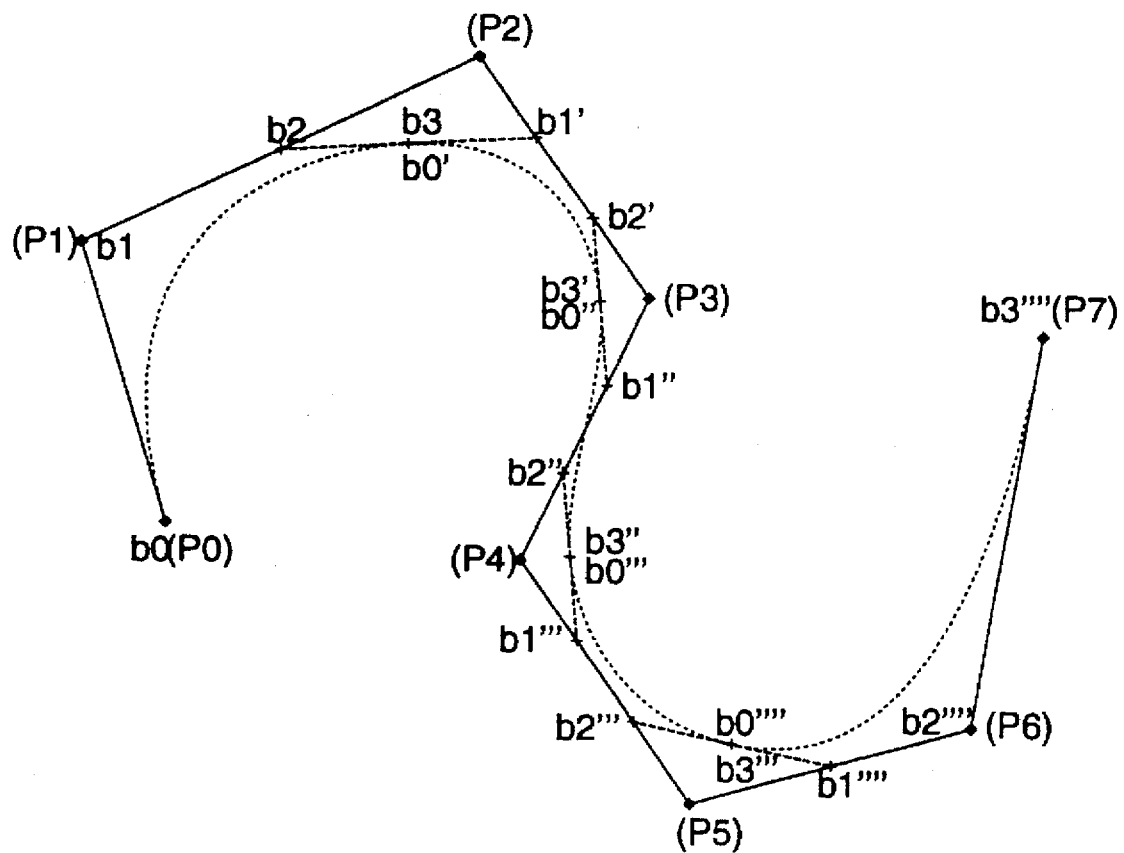
FIG. 6 shows both the B-spline control points and Bézier control points.

FIG. 5 is an example of a cubic B-spline curve represented by the piecewise Bézier curves. B-spline curve B4 is defined by control polygon B3 and a uniform knot vector B2. FIG. 3 shows the blending function curves for knot vector B2 and order B1. FIG. 5 shows the same cubic curve shown in FIG. 2, described instead by its equivalent Bézier control polygons B6–B10. The coefficients of the control polygons $\{b_0,b_1,b_2,b_3\}$ B6, $\{b_0',b_1',b_2',b_3'\}$ B7, . . . , $\{b_0'''',b_1'''',b_2'''',b_3''''\}$ B10 define five different cubic Bézier curves B11–B15. B-spline curve B4 from FIG. 2 and piecewise Bézier curve B11–B15 are superimposed on each other in FIG. 6 to show their relationship.

In FIG. 1, when Bézier motion blocks 14 are given to controller 6, XYZ interpolation points 16 on the Bézier curve must be generated and given to machine tool device 7 at a certain update rate. The actual update rate will depend on the update or cycle rate of controller 6 and may be adjustable, but will generally be in the range of one point every 10 milliseconds to one point every millisecond. The actual distance between XYZ interpolation points 16 depends on both the desired feed rate and the update rate with the distance being the feed rate divided by the update rate. To generate a smooth curve or surface, the distance between each interpolation point must be relatively small. To keep the distance between the interpolation points small with a fast feed rate, a fast update rate is required. Also, for machine tool 7 to run in a smooth manner with a constant feed rate, the spatial distance between each point must be relatively constant. Therefore, the problem is to generate equally spaced points along the Bézier curve as quickly as possible.

For non-rational cubic Bézier curves, the curve is represented as $$\gamma(t) = \sum_{i=0}^{3} b_i \theta_{i,3}(t).$$

The rational cubic Bézier curves is $$\gamma(t) = \dfrac{\sum_{i=0}^{3} w_i b_i \theta_{i,3}(t)}{\sum_{i=0}^{3} w_i \theta_{i,3}(t)}. \quad (8)$$

where $b_0,b_1,b_2$, and $b_3$ are the four vector coefficients of the control polygon of a cubic Bézier curve. From Equation (5), the basis functions of cubic Bézier curves are:

$$\theta_{0,3}(t)=(1-t)^3$$

$$\theta_{1,3}(t)=3(1-t)^2 t$$

$$\theta_{2,3}(t)=3(1-t)t^2$$

$$\theta_{3,3}(t)=t^3$$

Figure 7:
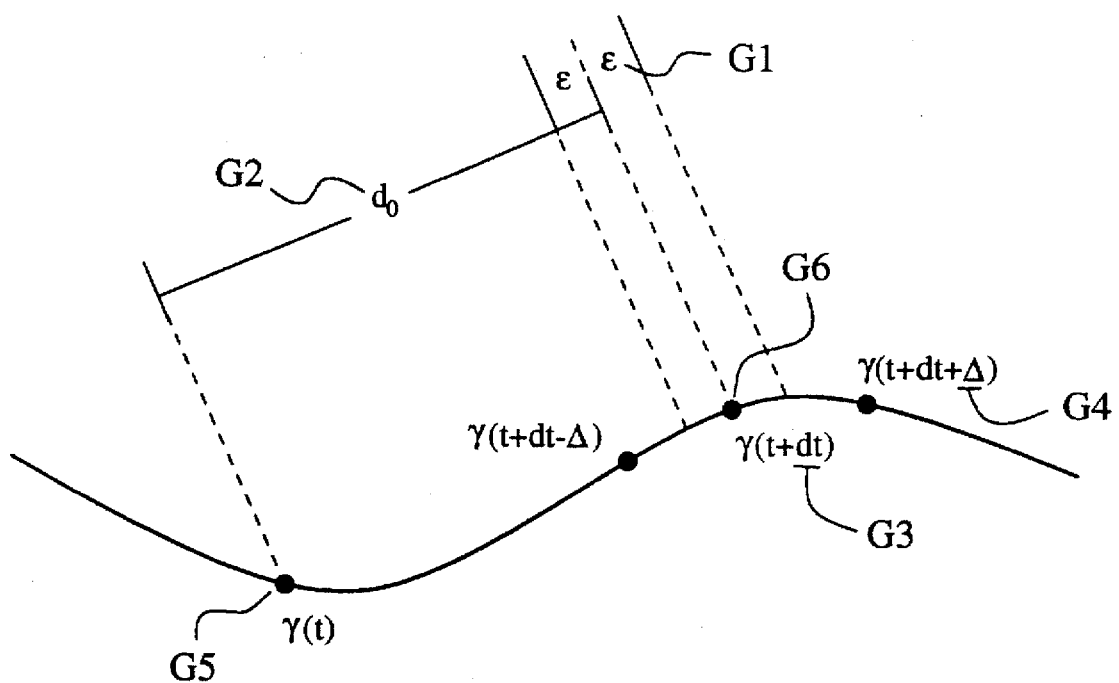
FIG. 7 shows a graphical description of the choosing of the next interpolation point on a B-spline curve.

Before the first curve position is evaluated by using Equation (8), the initial value of the parameter t should be determined. Refer to FIG. 7 for the following discussion. If dt G3 is the parametric step size and ΔG4 is the parametric substep size, the initial guess of parametric substep size G4, $\Delta_0^{[0]}$, for the first interpolation point is $$\Delta_0^{[0]} = \frac{dt_0^{[0]}}{2}$$

where $dt_0^{[0]}$ is the first guess of the parametric step size for the initial interpolation point discussed later.

Since the method of the present invention is an iterative method, the last parametric step size is used as an initial guess of the parametric step size for the next interpolation point, $$dt_{j+1}^{[0]} = dt = t_j - t_{j-1}.$$

For a cubic curve, the rate of change of the acceleration of the curve is linear. In a parameter space, this acceleration is a linear function of the parameter t. When the arclength step size along the curve is small, the change in the parameter t is small. In most cases, the last parametric step size is close to the desired parametric step size. If the interpolation point on the curve calculated by using the initial guess for the parametric step size is not within the tolerance of the desired step distance, the current parametric step size is adjusted.

Figure 8:
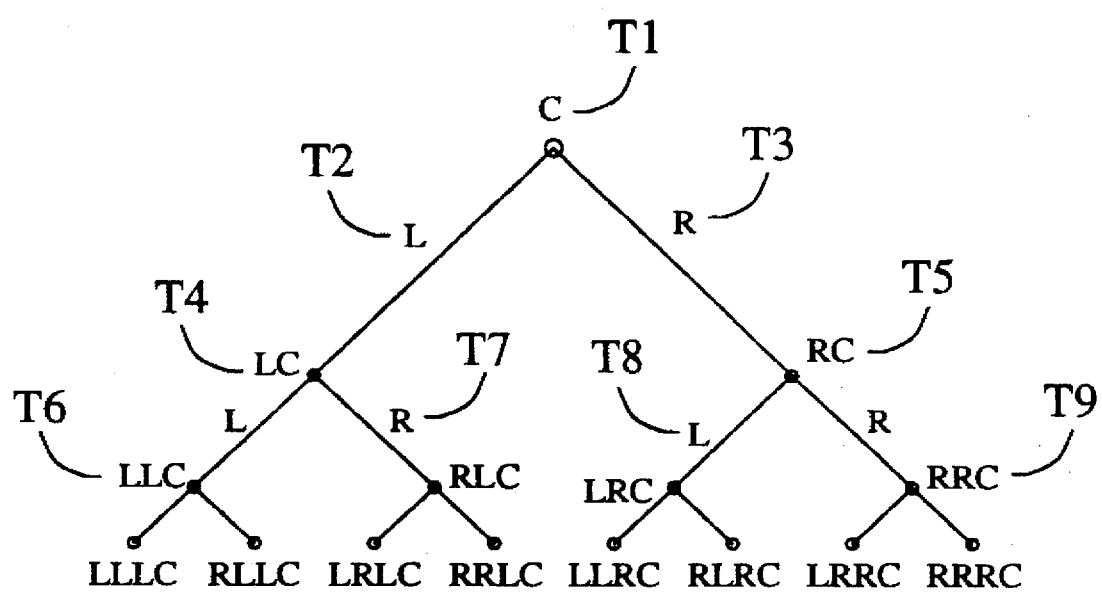
FIG. 8 shows the bisection tree.

FIG. 8 is used to explain the adjustments to the parametric step size. If the operation L T2 is denoted as the iterative assignment of $$dt_j^{[i+1]} = dt_j^{[i]} - \Delta_j^{[i+1]} \tag{9}$$

and operation R T3 as the iterative assignment of $$dt_j^{[i+1]} = dt_j^{[i]} + \Delta_j^{[i+1]} \tag{10}$$

then L T2 and R T3 operate on a segment C T1 to yield the "left" and "right" halves, LC T4 and RC T5, of C T1 in FIG. 8. Each node in the graph of FIG. 8 represents a particular step size where C T1 is the initial guess of the parametric step size and LC T4 is half of C T1. The chord-length distances that the parametric step sizes LC T4 and RC T5 represent, might not be equal. The bisection method as applied in this invention cuts the parametric substep in half after each iteration, $$\Delta_j^{[i+1]} = \frac{\Delta_j^{[i]}}{2}.$$

Alternately, any factor, $\alpha$, can be used to scale the step size after each iteration. The formula would then be $$\Delta_j^{[i+1]} = \frac{\Delta_j^{[i]}}{a}.$$

The iteration terminates when the interpolation point evaluated at some node in FIG. 8 is within the specified tolerance of the desired step distance, $d_0$.

1. Let $t_j^{[i]}$, $t_j^{[i]} = t_{j-1} + dt_j^{[i]}$, be the current guess for the parametric location of the next interpolation point. Also let $\Delta\gamma_j^{[i]} = \|\gamma(t_{j-1} + dt_j^{[i]}) - \gamma(t_{j-1})\|$ be the chord-length distance between the last interpolation point and the current guess of the next interpolation point. When $\Delta\gamma_j^{[i]}$ is within some tolerance of the desired step size, $d_0$, the search is stopped and the forward operation is made. There are three possible cases that need to be considered for each successive guess until a satisfactory guess is reached.

1. $|\Delta\gamma_j^{[i]} - d_0| < \epsilon$. The parametric step size $dt_j^{[i]}$ is satisfactory. Set $t_j = t_{j-1} + dt_j^{[i]}$ and output $\gamma(t_j)$ as the next interpolation point. Set $dt_{j+1}^{[0]} = dt_j^{[i]}$ as the next initial parametric step size and $$\Delta_{j+1}^{[0]} = \frac{dt_{j+1}^{[0]}}{2}$$

as the next initial substep size.

2. $\Delta\gamma_j^{[i]} - d_0 > \epsilon$. The parametric step size $dt_j^{[i]}$ has caused the interpolation point to "overshoot" the desired distance. Reduce the next parametric step size guess by the substep size, $dt_j^{[i+1]} = dt_j^{[i]} - \Delta_j^{[i]}$, and cut the next parametric substep size in half, $$\Delta_j^{[i+1]} = \frac{\Delta_j^{[i]}}{2}.$$

3. $\Delta\gamma_j^{[i]} - d_0 < -\epsilon$ In this case, the parametric step size, $dt_j^{[i]}$, is not large enough to cause the next interpolation point to be within range of the desired distance. Increase the next parametric step size guess by the substep size, $dt_j^{[i+1]} = dt_j^{[i]} + \Delta_j^{[i]}$, and cut the next parametric substep size in half, $$\Delta_j^{[i+1]} = \frac{\Delta_j^{[i]}}{2}.$$

This particular embodiment assumes that there is a limit on the number of iteration steps that can be taken to compute a given interpolation point. It also assumes that the next parametric step size will be less than twice the size of the current step size, i.e. $t_{j+1} - t_j < 2dt_j$. If the interpolation point at twice the current step size is not far enough along the curve to be within the tolerance of the desired step size, the next parametric step size halves the distance to twice the current step size until the number of iterations exceeds the limit.

Figure 9:
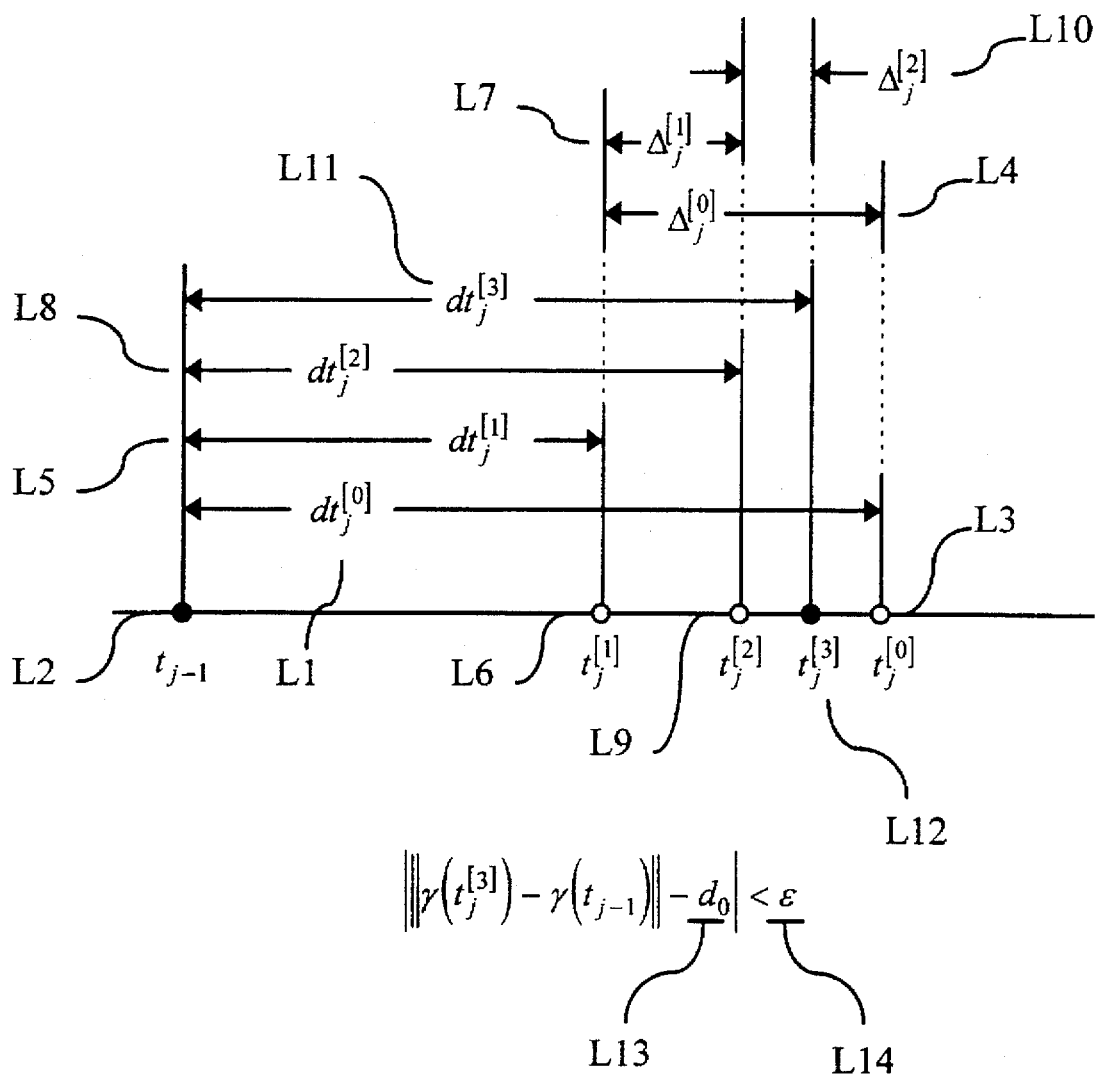
FIG. 9 represents the operation of bisection search.

An example is described by FIG. 9. Initial step size L1 is added to the parametric position of the last interpolation point L2 to obtain the initial guess of the parametric location of the next interpolation point L3. After computing the chord-length distance between the last interpolation point and the initial guess L3, it is determined that initial guess L3 overshoots desired step size L13. Case 2 above is utilized and current substep size L4 is subtracted from parametric step size L1, to produce second parametric step size L5. Second parametric step size L5 is added to the parametric position of last interpolation point L2 to obtain second guess L6 of the parametric location of the next interpolation point. After the chord-length distance to second guess L6 is computed, it is determined that second guess L6 undershoots desired step distance L13. Case 3 from above then applies, and second substep L7 is added to second parametric step size L5 to produce third parametric step size L8. Once again, after the chord-length distance to third guess L9 is computed, it is determined that third guess L9 undershoots desired step distance L13. Case 3 from above applies again and third substep L10 is added to third parametric step size L8 to produce fourth parametric step size L11. When added to the parametric location of the last interpolation point L2, fourth guess L12 is within accepted tolerance L14 of desired step distance L13. Case 1 applies from above and fourth guess L12 is outputted to machine tool 7.

For each cubic Bézier segment of the curve (either rational or non-rational), the parameter t is defined from 0 to 1. Even though the bisection method as applied above can adjust t up or down very quickly, it is still necessary to find a good initial value for dt for the first interpolation point to minimize the adjustment time. Given an initial guess for dt in (0, 1), the adaptive method may adjust down or adjust up many times until the step is found to be within the tolerance to do the forward operation. If the calculation is done outside CNC controller, the initial scaling down of dt may not be required. If, however, the calculation is done the inside CNC controller, the desired step L13 must be found within the update rate. It is therefore necessary to determine a reasonable initial parametric step size, $dt_0^{[0]}$.

Figure 10:
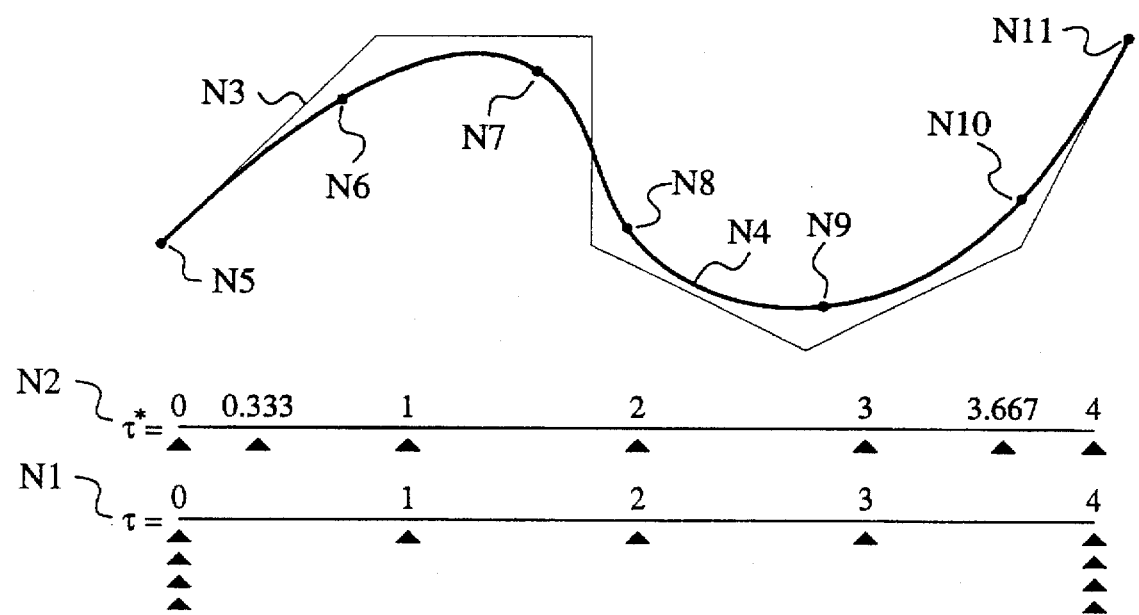
FIG. 10 shows the knot vector for a B-spline curve and the parametric values and positions of the nodes of the curve.

The method of the present invention is to determine the initial parametric step size $dt_0^{[0]}$ based on properties of B-splines relating to node values of the B-spline curve. Refer to FIG. 10 for the following discussion. If $\tau=\{\tau_i\}_0^{q=n+k}$ is a knot vector K1 for a given B-spline curve K2, then node values K3 of the curve are $\tau^*=\{\tau_i^*\}_0^{q=n}$ where $$\tau_j^* = \frac{\tau_{j+1} + \ldots + \tau_{j+k-1}}{k-1} \tag{11}$$

Since control polygon K4 has a direct correspondence to nodes N2, control polygon K4 can be made into a piecewise linear curve with the parametric values at the coefficients of the control polygon being equal to corresponding nodes K5–K10 according to the following equation:

$$L_{\tau,\gamma}(t) = \frac{(t - \tau_i^*)}{(\tau_{i+1}^* - \tau_i^*)} P_i + \frac{(\tau_{i+1}^* - t)}{(\tau_{i+1}^* - \tau_i^*)} P_{i+1}, \tag{12}$$

$$\tau_i^* \leq t < \tau_{i+1}^*.$$

It is known, then, by the variation diminishing property of B-splines, that the linearized polygon, $L_{\tau,\gamma}(t)$, differs from the value of the curve at the corresponding node, $\gamma(\tau_i^*)$, by a quadratic term of t. That is, $$\gamma(\tau_i^*) - L_{\tau,\gamma}(t) = O(|t|^2) \tag{13}$$

Therefore, linearized polygon K4 is a good approximation to curve K3 at node points K5–K10. From this, a relationship between the arclength of the curve and the parametric domain of the curve can be established. In particular, $$\frac{\Delta s^i}{\Delta P^i} = \frac{\Delta \tau^i}{\Delta n^i} \tag{14}$$

over a given interval, i, where $\Delta s^i$ is the arclength step size on the curve between node points, $\gamma(\tau_i^*)$ and $\gamma(\tau_{i+1}^*)$, $\Delta P^i$ is the length of the segment of the control polygon between coefficients $P_i$ and $P_{i+1}$, $\Delta \tau^i$ is the parametric step size in the interval between the node values $\tau_i^*$ and $\tau_{i+1}^*$, and $\Delta n^i$ is the parametric interval between the two nodes $\tau_i^*$ and $\tau_{i+1}^*$. When i=0, then $\Delta \tau^0 = dt^{[0]}$, $\Delta P^0 = \|P_1 - P_0\|$, $\Delta s^i = d_0$, and from Equation (11), $$\Delta n^i = \frac{1}{k-1}$$

for the Bézier case. Solving for $dt^{[0]}$ by substitution into Equation (14), $$dt^{[0]} = dt = \frac{d_0}{(k-1)\|P_1 - P_0\|}. \tag{15}$$

The method of the present invention utilizes an adaptive forward difference operation to determine the next step size, since the relationship between the arclength of the curve and the parameterization of that curve is not constant. The difference between the desired arclength step size, $d_0$, and the actual step size, $d_i$, is determined to within some tolerance, $\epsilon$, that is, $$\|d_i - d_0\| \leq \epsilon \tag{16}$$

The smaller the value of $\epsilon$, the more adaptive steps are taken to determine the next step size.

The desired arclength step size is inputted to the adaptive method described here and is utilized to control the velocity at which the machine tool device travels. To determine the desired arclength step size, controller 6 requests the distance left to travel from the interpolation module so that it can accelerate and decelerate appropriately. A simple embodiment of this method of the present invention takes smooth blend of the distance between the current position on the curve and the end of the curve and the distance left to travel computed from an arclength parameterization of the control polygon scaled to match the parametric domain of the curve. For a Bézier curve, the parametric domain is [0,1]. Suppose that $$\Gamma(t;0,1) = (1-t) \sum_{i=0}^{n-1} \Delta P_i$$

is the normalized distance left to travel function for the control polygon. Then the simple embodiment computes the distance left to travel as $$dlt = \|\gamma(t) - \gamma(1)\| t + \Gamma(t)(1-t). \tag{17}$$

Although this is clearly an approximation, as the machine tool approaches the start of deceleration, the approximation becomes more accurate and produces acceptable results. This method works best in the context of Bézier curves since the parameterization is well-behaved.

An alternate method for computing the distance left to travel that produces more accurate results for NURBS curves in particular, is the following. Along with the piecewise linear function defined by Equation (12), another piecewise linear function is defined by connecting the node points of the curve with a similar parameterization to that of Equation (12). Thus, $$G_{\tau,\gamma}(t) = \frac{(t - \tau_i^*)}{(\tau_{i+1}^* - \tau_i^*)} \gamma(\tau_i^*) + \tag{18}$$

$$\frac{(\tau_{i+1}^* - t)}{(\tau_{i+1}^* - \tau_i^*)} \gamma(\tau_{i+1}^*), \tau_i^* \leq t < \tau_{i+1}^*.$$

In this method the distance left to travel is determined by an average of the distance functions of the two curves, $G_{\tau,\gamma}(t)$ and $L_{\tau,\gamma}(t)$. Suppose the domain of the NURBS curve is [a, b]. If $\Delta g^i = \|\gamma(\tau_{i+1}^*) - \gamma(\tau_i^*)\|$ then the distance left to travel function of $L_{\tau,\gamma}(t)$ can be expressed as $$L_{\tau,\gamma}^{dlt}(t) = \frac{(b-t)}{(\tau_{i+1}^* - \tau_i^*)} \Delta P^i + \sum_{j=i+1}^{n-1} \Delta P^j, \tau_i^* \leq t < \tau_{i+1}^*, \tag{19}$$

and the distance left to travel function of $G_{\tau,\gamma}(t)$ can be expressed as $$G_{\tau,\gamma}^{dlt}(t) = \frac{(b-t)}{(\tau_{i+1}^* - \tau_i^*)} \Delta g^i + \sum_{j=i+1}^{n-1} \Delta g^j, \tau_i^* \leq t < \tau_{i+1}^*. \tag{20}$$

The computation of dlt from these functions is $$dlt = \frac{G_{\tau,\gamma}^{dlt}(t) + L_{\tau,\gamma}^{dlt}(t)}{2} \tag{21}$$

This distance left to travel function is not particularly time consuming to compute and provides a substantially more accurate measure of the distance left to travel for NURBS curve.

Figure 11:
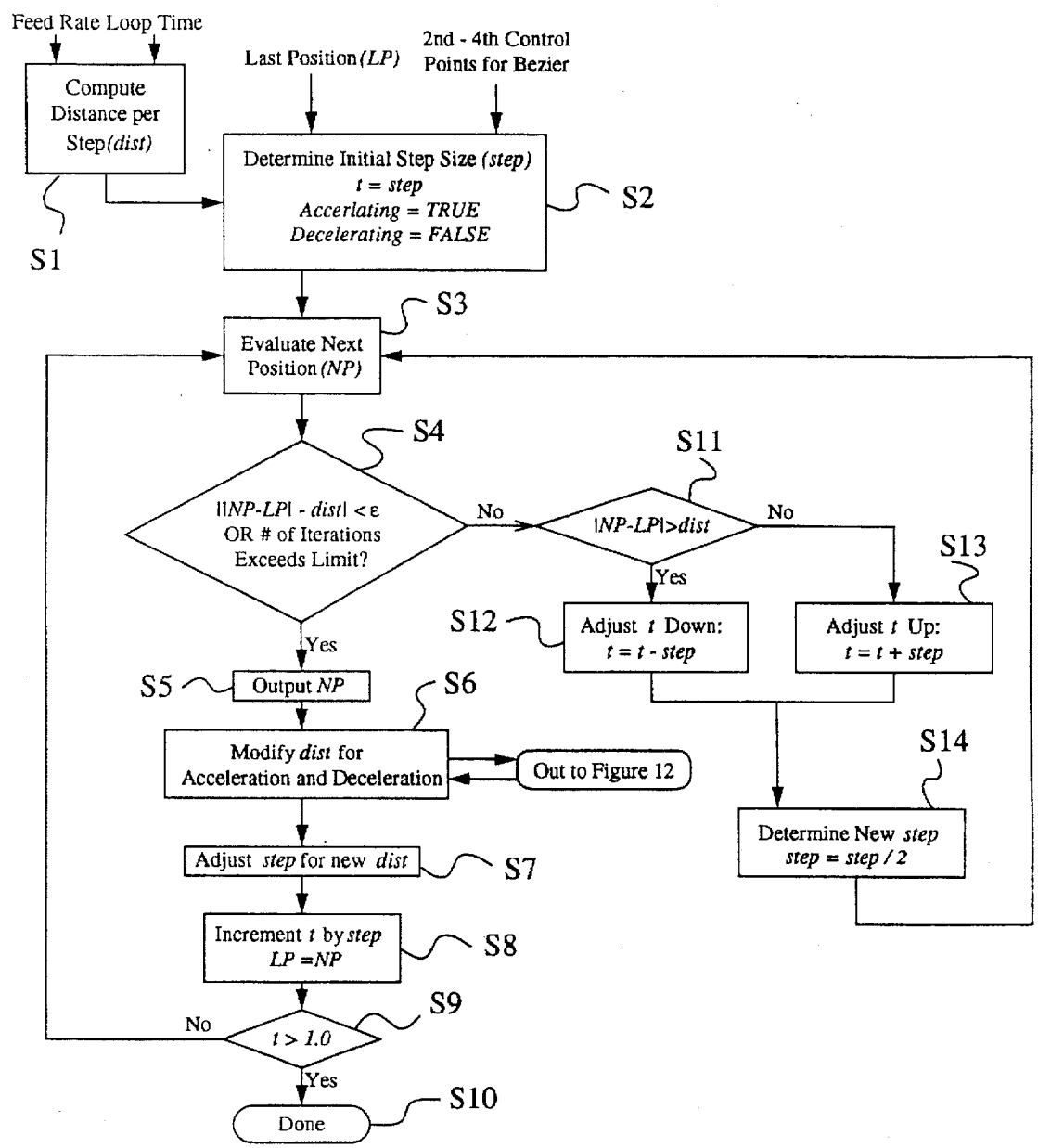
FIG. 11 is a flow chart of the controlled velocity interpolation algorithm for Bézier curves.
Figure 12:
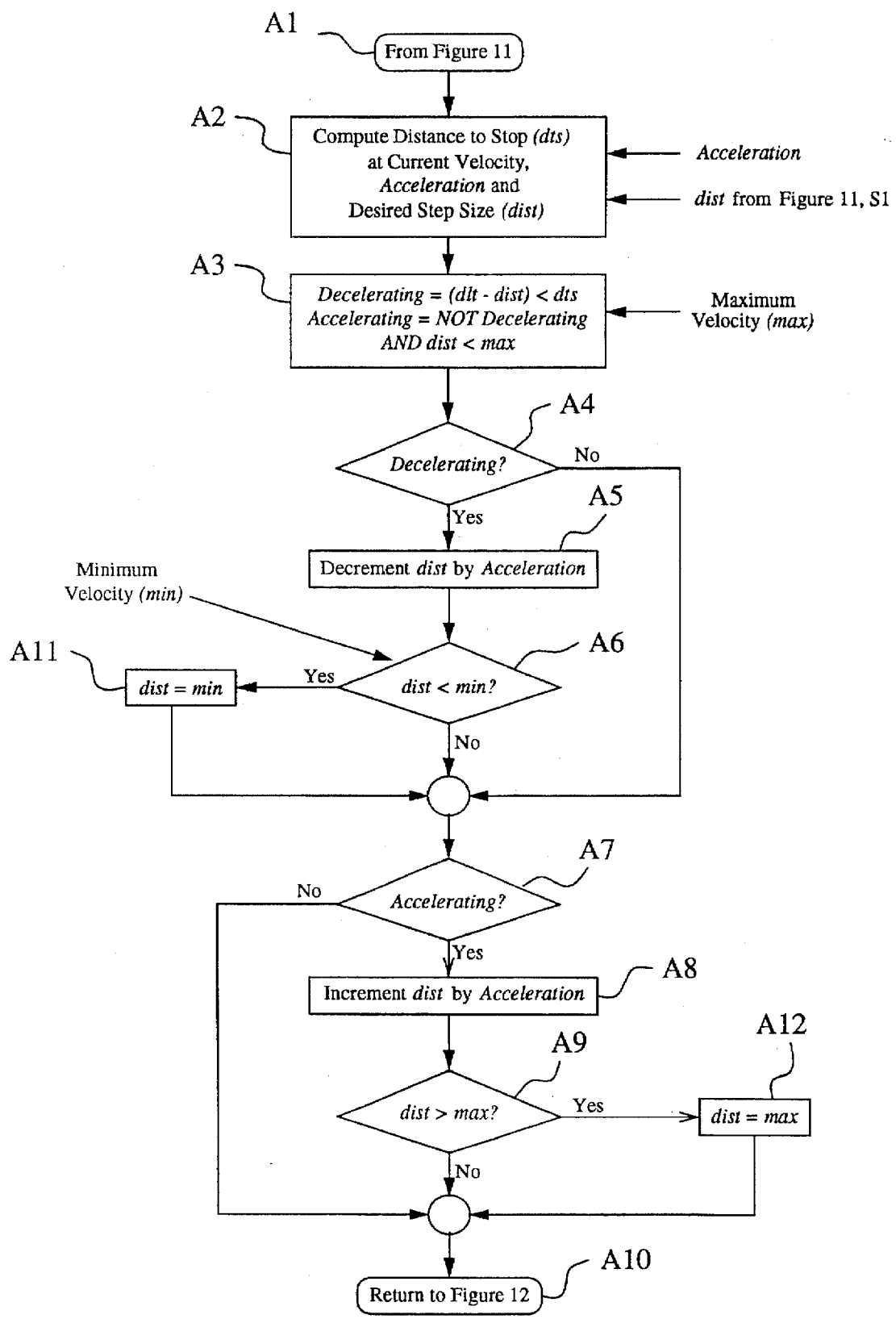
FIG. 12 is a flow chart of the feed rate modification necessitated by acceleration and deceleration at the endpoints of the curve.

The diagram of the method of the present invention for controlled velocity interpolation of Bézier and NURBS curves is presented in FIG. 11 and FIG. 12. This method corresponds to controller 6 output of interpolated positions 16 to machine tool 7 in FIG. 1. For the discussion of the following steps of this adaptive method, refer to FIG. 11 and FIG. 12. The input to controller 6 comprises the desired Feed Rate, the lower bound of the processing time per loop step, or the Loop Time, and the second through fourth coefficients of the control polygon of the Bézier curve to be interpolated. The last position of the machine tool, LP, is provided by the current state of controller 6. The Feed Rate and the Loop Time are used to compute the desired distance per step, dist, in step S1, according to the following formula, dist=Feed Rate * Loop Time where Loop Time is proportional to the clock rate of processor 6 in the preferred embodiment of the invention. The Loop Time can be determined empirically, or can be measured by the average number of instructions executed per step within the loop.

In step S2, the initial value for step is determined by the node method of Equation (15) using the inputted coefficients, LP, and dist. The parameter t is initialized to the value of step. In addition, Accelerating is set to TRUE and Decelerating is set to FALSE. In step S3, the next interpolated position, NP, is computed from Equation (8). The next position, NP is then evaluated to see if it is within $\epsilon$ of the desired distance to travel, dist, or if the number of iterations exceeds the limit, in step S4. If neither of these conditions are true, we enter step S11. Otherwise we proceed to step S5.

In step S11, the difference between NP and LP is checked to see if it exceeds dist. If so, step is subtracted from t in step S12. Otherwise, step is added to t in step S13. Then in step S14, step is divided by 2 or another factor, $\alpha$, and we proceed back to the top of the loop at step S3. In an alternate embodiment of the present invention, the next value of t can be can be determined by one of several techniques. In the first of the alternate methods, the amount of overshoot or undershoot is determined by a ratio of the difference between NP and LP and the desired step distance, dist. This ratio is then used to determine the next value of t. The step size is set to be the difference between the next value of t and the last value of t, and then is divided by the factor of 2 or $\alpha$. The second alternative method fits a quadratic curve to the distances between the next position NP, and the last two computed positions and determines the next parametric value of t by using this curve as an quadratic estimate of the distance.

When step S5 is reached, NP is output to controller 6. In step S6, we proceed to step A1 of FIG. 12 to modify dist for acceleration and deceleration if necessary. Upon return from the process detailed in FIG. 12 at step A10, we proceed to step S7. In step S7, we obtain a new parametric step size, step, by taking a ratio of the new curve length step size, dist to the old curve length step size, and multiplying it by the old parametric step size. That is, $$step_{new} = \frac{step_{old} * dist_{new}}{dist_{old}}.$$

In step S8, t is incremented by step * 2 or step * $\alpha$ and LP is set to the value of NP. Step S9 determines if the interpolation is finished by checking if the parametric value of t exceeds the bounds of the Bézier curve which is 1. If not, we proceed to step S3. If so, the interpolation terminates at step S10.

FIG. 12 details the process of controller 6 which determines if the velocity needs to increase or decrease according to the parametric position t on the inputted curve. Step A1 of FIG. 12 is entered from step S6 of FIG. 11. Step A2 computes the distance to stop, dts, at the current Feed Rate, Acceleration and desired step size, dist. Also in step A2, the distance left to travel, dlt, is computed from Equation (17) or Equation (21). In step A3, the controller determines if it should be accelerating or decelerating by setting Decelerating to true if the distance left to travel, dlt, minus the desired step size, dist, is less than the distance to stop, dts, and by setting Accelerating to TRUE if Decelerating is FALSE and the desired step size is less than the largest step size, max, allowed by the controller 6. Step A4 checks if controller 6 should decelerate. If so, controller 6 proceeds to step A5. If not, controller 6 skips to step A7.

In step A5, dist is decremented by the Acceleration provided by the controller 6. In step A6, if dist is smaller than the smallest step size allowed by controller 6, min, then dist is set to min. Controller 6 then proceeds to step A7.

In step A7, if controller 6 determines that it is not Accelerating, then it returns to step S6 of FIG. 11. Otherwise, dist is incremented by Acceleration in step A8, checked against the largest step size allowed by controller 6, max. If dist is greater than max, in step A9, dist is set to max in step A12. In step A10, controller 6 returns to step S6 of FIG. 11.

One realized embodiment of the invention for testing CPU time was written in C language running in UNIX with a 68030 microprocessor. Computer source code which implements this embodiment is in Appendix A. The results shown that the average CPU run time is about 150 microseconds for each loop for the adaptive method and about 240 microseconds for the subdivision method. Therefore, the approximate maximum CPU time required to calculate the next position on the cubic Bézier curves with an equal forward step is about 1 millisecond using the method of the present invention (running on a 68030 processor).

Computer programs implementing the method of this invention will commonly be distributed to users on a computer-readable medium such as floppy disk or CD-ROM. From there, they will often be copied to a hard disk or a similar intermediate storage medium. When the programs are to be run, they will be loaded either from their distribution medium or their intermediate storage medium into the execution memory of the computer, configuring the computer to act as a mass storage emulator or mass storage access program. All these operations are well-known to those skilled in the art of computer systems.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

APPENDIX A

```
    /* Rational version of AFD. */
    #define TRUE    1
    #define FALSE   0
5   extern double sqrt();
    extern output();

double allowance_factor = 0.01;
    int iteration_limit = 10;
10  int iteration_max;

double x0,y0,z0,r0;         /* x0,y0,z0,r0 is the initial point. */ int loop_cnt;
15  double distance, step0, subStep, step, cp_len;
    double t, lastX, lastY, lastZ, thisX, thisY, thisZ, thisR, endX, endY, endZ;

double
    AFD( x1,y1,z1,r1, x2,y2,z2,r2, x3,y3,z3,r3, dist )
20  double x1,y1,z1,r1, x2,y2,z2,r2, x3,y3,z3,r3, dist;
    {
        char overshot;
        double dx, dy, dz, dlt, allowance;

25      /* Point last moved to along curve. */
        lastX = x0/r0; lastY = y0/r0; lastZ = z0/r0;

/* Initial step: geometric step over parametric speed. */
        dx = x1/r1 - x0/r0;  dy = y1/r1 - y0/r0;  dz = z1/r1 - z0/r0;
30      distance = sqrt( dx*dx + dy*dy + dz*dz );
        cp_len = distance;       /* First step of ctl poly length calculation. */
        if ( distance < 0.0001 )
        {
            /* Let's define it to be invalid to put the first two control points
35           * directly on top of each other.
             */
            return dist;
        }
        step0 = dist/(distance * 3.0);
40      step = step0;
        t = step0;               /* Do not need to calculate start point. */
        subStep = step0 / 2.0;

overshot = FALSE;        /* Need to overshoot once initially. */
45      loop_cnt = 0;            /* Also reset after each output point. */

/* Calculate the length of the control polygon for later distance left to
         * travel (DLT) approximation.
         */
50      dx = x2/r2 - x1/r1;  dy = y2/r2 - y1/r1;  dz = z2/r2 - z1/r1;
```

```
cp_len += sqrt( dx*dx + dy*dy + dz*dz );
endX = x3/r3; endY = y3/r3; endZ = z3/r3;   /* Endpoint of the curve. */
dx = endX - x2/r2;  dy = endY - y2/r2;  dz = endZ - z2/r2;
cp_len += sqrt( dx*dx + dy*dy + dz*dz );

while ( t <= 1.000 )
{
    /* Compute next pt on the cubic bezier curve from current t guess. */
    double TInv = 1-t,
           TI2  = TInv * TInv,
           T2   = t * t,
           C    = TI2 * TInv;

loop_cnt++;

thisX = x0 * C;  thisY = y0 * C;  thisZ = z0 * C;  thisR = r0 * C;
    C = 3.0 * TI2 * t;
    thisX += x1 * C;  thisY += y1 * C;  thisZ += z1 * C;  thisR += r1 * C;
    C = 3.0 * TInv * T2;
    thisX += x2 * C;  thisY += y2 * C;  thisZ += z2 * C;  thisR += r2 * C;
    C = T2 * t;
    thisX += x3 * C;  thisY += y3 * C;  thisZ += z3 * C;  thisR += r3 * C;
    thisX /= thisR;  thisY /= thisR;  thisZ /= thisR;

dx = thisX - lastX; dy = thisY - lastY; dz = thisZ - lastZ;
    distance = sqrt( dx*dx + dy*dy + dz*dz );

allowance = allowance_factor * dist;
    if ( loop_cnt < iteration_limit )
    {
        if ( distance > dist && distance - dist > allowance )
        {
            /* Overshoot case. */
            overshot = TRUE;
            t -= subStep;
            step0 -= subStep;

subStep = subStep / 2.0;
            continue;
        }
        else if ( distance < dist && dist - distance > allowance )
        {
            /* Undershoot case. */
            if ( !overshot && t + step <= 1.0 ) subStep = step;
            t += subStep;
            step0 += subStep;

subStep = subStep / 2.0;
            continue;
        }
    }

/* Within tolerance case.
     *
```

```
         * Calculate approximate DLT (distance left to travel) for
         * feedrate calculation, which will change the step dist for
         * acceleration and deceleration.
         *
  5      * Use 1-T times the control polygon length as an over-estimate of
         * the distance left to travel which won't get confused if the
         * curve passes by the destination point, the distance to the
         * destination point as an under-estimate that gets better as we
         * approach the end, and blend from the control polygon estimate
 10      * to the endpoint estimate.
         */
        dx = endX - thisX;  dy = endY - thisY;  dz = endZ - thisZ;
        distance = sqrt( dx*dx + dy*dy + dz*dz );
        dlt = cp_len * TInv + distance * t;
 15     dlt *= .5;              /* Leave some elbow room. */ step0 /= dist;  /* Compensate for dist change. */
        output( t, thisX, thisY, thisZ, dlt,
                &dist ); /* dist may be changed. */
 20     step0 *= dist;  /* Compensate for dist change. */ if ( loop_cnt > iteration_max )
                iteration_max = loop_cnt;
        loop_cnt = 0; /* Start counting for the next point. */
 25
        overshot = FALSE;
        t += step0;
        subStep = step0;
        step = step0;
 30
        lastX = thisX;  lastY = thisY;   lastZ = thisZ;
        subStep = subStep / 2.0;
    }

35 x0 = x3;  y0 = y3;  z0 = z3;  r0 = r3;

dx = endX - thisX;  dy = endY - thisY; dz = endY - thisZ;
    distance = sqrt( dx*dx + dy*dy + dz*dz );
    dlt = dist - distance;
 40 return dlt;                    /* Distance left to travel. */
    } if 1
    double max_speed    = 0.05;     /* Lots of points (150-200) */
 45 #else
    double max_speed    = 0.5;      /* Very fast, only 15-20 points. */
    #endif if 0
 50 int vary_speed      = TRUE;
    #else
    int vary_speed      = FALSE;
    #endif
```

41

```
#if 1
# define D 2.0                    /* Rational denominator. */
#else
# define D 1.0                    /* Should work just like non-rational data. */
endif if 1                             /* For rational 90 degree arc instead. */
if 1
        /* For rational quadratic arcs, corner denom is cos( half_angle=45 )/2.
         * Then to raise order to cubic, go 2/3 of the way from start denom value
         * (1.0) to corner denom value.
         */
# define HALF_ROOT2 .70710678118654752440
# define DENOM (HALF_ROOT2 * 2./3. + 1./3. )
# else
# define DENOM 1.0      /* For comparison with true arc.*/
# endif
endif double acceleration = 0.1;
double min_speed    = 0.05;
int accelerating, decelerating;

main( argc, argv )
int argc;
char *argv[];
{
    double remainder;

static double pts[4][4] = {
#ifdef DENOM
                              /* 90 degree arc centered at [0, -4]. */
        -4.0, 0.0, 0.0, 1.0,  -4./3., HALF_ROOT2 * 8./3., 0.0, DENOM,
        4./3., HALF_ROOT2 * 8./3., 0.0, DENOM,  4.0, 0.0, 0.0, 1.0
#else
                              /* Original data * rational scale factor. */
        -4.0, -2.0, 0.0, 1.0, -4.0*D, 0.0, 0.0, D,
        4.0*D, 0.0, 0.0, D,   4.0, -2.0, 0.0, 1.0
#endif
    };

x0 = pts[0][0]; y0 = pts[0][1]; z0 = pts[0][2]; r0 = pts[0][3];
    lastX = x0/r0; lastY = y0/r0; lastZ = z0/r0;
    accelerating = TRUE; decelerating = FALSE;

output( 0.0, x0,y0,z0, 0.0, 0 );

remainder = AFD( pts[1][0], pts[1][1], pts[1][2], pts[1][3],
                     pts[2][0], pts[2][1], pts[2][2], pts[2][3],
                     pts[3][0], pts[3][1], pts[3][2], pts[3][3],
                     vary_speed ? min_speed : max_speed );

printf( "iteration_max = %d, remainder = %g\n", iteration_max, remainder );
}
```

42

```
       output( t, x,y,z, dlt, dist )
       double t, x,y,z, dlt, *dist;
       {
 5         /* Debugging output. */
           if ( dist == 0 )
               printf( "\n" );
           printf( "t=%+7.4f pt(%+7.4f,%+7.4f,%+7.4f) ", t, x,y,z );
       #ifdef DENOM                          /* Compare to proper radius, 4*sqrt(2) . */
10         printf("r=%6.4f, ", sqrt( x*x+(y+4.)*(y+4.)+z*z ) / (4. * sqrt(2.0)) );
       #endif
           if ( dist != 0 )
           {
               double dx, dy, dz, distance, dist_accuracy;
15
               dx = x - lastX; dy = y - lastY; dz = z - lastZ;
               distance = sqrt( dx*dx + dy*dy + dz*dz ); /* Dist to previous pt. */
               dist_accuracy = 100.0 * (distance - *dist) / *dist;

20             printf("dlt=%+7.4f, dist=%+7.4f(%+4.1f%%) n=%d\n",
                      dlt, *dist, dist_accuracy, loop_cnt );
           }
           else
               printf( "start\n" );
25
           /* Adjust the distance of next step for acceleration/deceleration. */
           if ( vary_speed && dist != 0 )
           {
               if ( accelerating )
30             {
                   *dist += acceleration;
                   if ( *dist > max_speed )
                   {
                       *dist = max_speed;
35                     accelerating = FALSE;
                   }
               }
               if ( ! decelerating )
               {
40                 /* Approximation: time to start decelerating when we would
                    * decelerate at close to the max rate to get stopped (velocity 0)
                    * by the endpoint.  Since we are iterating with a fixed time per
                    * output point, the step dist is the velocity per loop step.
                    * i.e. We'll use the loop time as our time unit.
45                  */
                   double speed, dist_to_end = 0;
                   for ( speed = *dist; speed > 0; speed -= acceleration )
                       dist_to_end += speed;

50                 decelerating = (dlt - *dist) < dist_to_end;
               }
               if ( decelerating )
               {
                   *dist -= acceleration;
```

```
            if ( *dist < min_speed )
                *dist = min_speed;
        }
    }
5 }
```

We claim:

1. A method for controlling the movement of a cutting tool on a numerically-controlled device, running on a digital computer controlling said cutting tool, said method comprising:

inputting to said digital computer:

a plurality of codes defining a NURBS curve through which said cutter head will travel, said codes comprising:

codes to specify an initial position of said cutting tool,
codes to specify the order of said NURBS curve, codes to specify the number of control points in the control polygon of said NURBS curve,
codes to specify the knot vector of said NURBS curve, and codes to define other positions defining said control polygon of said NURBS curve through which said cutting tool will travel;
and a code specifying a desired feed rate;

determining a curve length distance from said codes defining said NURBS curve through which said cutting tool will travel;

determining an initial curve length step size from said desired feed rate and a value which represents the amount of time required to compute one step;

determining a parametric step size with a node-based approximation of the derivative at said initial position on said NURBS curve through which said cutting tool will travel;

determining distance traveled in step to be the euclidean distance traveled during said parametric step size;

determining curve length difference to be the difference between said initial curve length step size and said distance traveled in step;

modifying said parametric step sized based on an error measure of said curve length difference;

computing a distance left for said cutting tool to travel for said cutting tool;

determining an output position by evaluation of the parametric equations defined by said order, knot vector, and control points for said NURBS curve where a next parameter t is the sum of the current value of t and said parametric step size;

and moving said cutting tool in accordance with said output positions.

2. The method of claim 1, wherein modification of said parametric step size based on an error measure of said curve length difference uses a bisection method where a previous substep size is multiplied by a substep size factor, α, to obtain a next substep size.

3. The method of claim 2, wherein said substep size factor, α, is equal to one half.

4. The method of claim 1, wherein said curve length distance is approximated by a linear combination of the node points and said control points of said NURBS curve weighted by said current parametric value t and the parametric values of said node points.

5. The method of claim 1, wherein said curve length difference is decreased by an acceleration rate if said distance required to stop said cutting tool is less than the distance left for said cutting tool to travel, and said curve length difference is increased by said acceleration rate if the current velocity is less than said desired feed rate.

6. A digital computer, programmed to perform the method of claim 1.

7. The digital computer of claim 6, where said digital computer is a component of a numerically-controlled device.

8. A computer-readable medium, storing a program that performs the method of claim 1.

9. The computer-readable medium of claim 8, where said computer-readable medium is a floppy disk.

10. A method for controlling the movement of a cutting tool having a cutter head on a numerically-controlled device, running on a digital computer controlling said cutting tool, said method comprising:

inputting to said digital computer:

a plurality of codes defining a cubic Bézier curve through which the cutter head will travel, said codes comprising:

codes to specify an initial position of said cutting tool, and codes to define the three other positions defining said control polygon of said cubic Bézier curve through which said cutting tool will travel;
and a code specifying a desired feed rate;

determining a curve length distance from said codes defining said cubic Bézier curve through which said cutting tool will travel;

determining an initial curve length step size from said desired feed rate and a value which represents the amount of time required to compute one step;

determining a parametric step size with a node-based approximation of the derivative at said initial position on said cubic Bézier curve through which said cutting tool will travel;

determining distance traveled in step to be the euclidean distance traveled during said parametric step size;

determining curve length difference to be the difference between said initial curve length step size and said distance traveled in step;

modifying said parametric step sized based on an error measure of said curve length difference;

computing a distance left for said cutting tool to travel based on deceleration parameters for said cutting tool;

determining an output position by evaluation of the parametric equations of said cubic Bézier curve utilizing the Bernstein basis functions, where a next parameter t is the sum of the current value of t and said parametric step size;

and moving said cutting tool in accordance with said computed output positions.

11. The method of claim 10, wherein modification of said parametric step size based on said error measure of said curve length difference uses a bisection method where a previous substep size is multiplied by a substep size factor, α, to obtain a next substep size.

12. The method of claim 11, wherein said substep size factor, α, is equal to one half.

13. The method of claim 10, wherein said curve length is approximated by a linear combination of said node and said control points of said cubic Bézier curve weighted by said current parametric value t and said parametric values of said node points.

14. The method of claim 10, wherein said curve length difference is decreased by an acceleration rate if said distance required to stop said cutting tool is less than said distance left for said cutting tool to travel, and said curve length difference is increased by said acceleration rate if the current velocity is less than said desired feed rate.

15. A digital computer, programmed to perform the method of claim 10.

16. The digital computer of claim 15, where said digital computer is a component of a numerically-controlled device.

17. A computer-readable medium, storing a program that performs the method of claim 10.

18. The computer-readable medium of claim 17, where said computer-readable medium is a floppy disk.

* * * * *